United States Patent [19]

Minakuchi

[11] 3,970,909
[45] July 20, 1976

[54] CONSTANT SPEED REGULATOR FOR DC MOTOR

[75] Inventor: Hiroshi Minakuchi, Kadoma, Japan

[73] Assignee: Matsushita Electric Industrial Co., Ltd., Japan

[22] Filed: Aug. 29, 1974

[21] Appl. No.: 501,848

[30] Foreign Application Priority Data

Sept. 10, 1973  Japan.............................. 48-102522

[52] U.S. Cl................................ 318/341; 318/327
[51] Int. Cl.²............................................ H02P 5/16
[58] Field of Search ........................... 318/326–328, 318/341

[56] References Cited
UNITED STATES PATENTS

| | | | |
|---|---|---|---|
| 3,596,162 | 7/1971 | Takayama............................ | 318/341 |
| 3,629,677 | 12/1971 | Means................................ | 318/341 |
| 3,783,360 | 1/1974 | Bundy............................ | 318/341 X |
| 3,843,913 | 10/1974 | Schaub et al. .................. | 318/328 X |

*Primary Examiner*—Gene Z. Rubinson
*Attorney, Agent, or Firm*—Burgess Ryan and Wayne

[57] ABSTRACT

In a constant speed regulator for a DC motor of the type in which the output of a generator mechanically coupled to a DC motor is converted into a square waveform output whose pulse duration or width is constant but whose duty cycle varies in response to the rotational speed of the DC motor, and the square waveform output is integrated so that the rotational speed of the DC motor may be controlled in response to the integrated output, an improvement comprising a series-circuit of a capacitor and a resistor connected between the output terminal of an integrator and the DC motor and a constant voltage circuit or a constant voltage regulating circuit shunting a DC power source, thereby eliminating the ripple component in the output of the integrator.

11 Claims, 3 Drawing Figures

CONSTANT SPEED REGULATOR FOR DC MOTOR

BACKGROUND OF THE INVENTION

The present invention relates to a constant speed regulator for a DC motor the regulator being capable of substantially eliminating the ripple component in the DC component which varies in response to the rotational speed of a DC motor, thereby ensuring stable speed control of the DC motor.

In a prior art constant speed regulator for a DC motor, a transistor is turned on and off in response to output of a generator mechanically coupled to a DC motor, and the output of the transistor is applied to a differentiating circuit to form the trigger pulse to trigger a monostable multivibrator. The monostable multivibrator produces a square waveform output whose duty cycle varies in response to the frequency of the trigger pulses, and the output of the monostable multivibrator is integrated by an integrator to derive a DC voltage which varies in response to the rotational speed of the DC motor. In response to the DC output voltage, a control transistor is so operated that when the rotational speed of the DC motor increases, the control transistor provides a signal that decreases the rotational speed, while when the rotational speed decreases, the control transistor provides a signal that increases the rotational speed.

The DC output voltage of the speed regulator contains the ripple component whose frequency is dependent upon the output frequency of the generator mechanically coupled to the DC motor. When the frequency of the ripple component is so high that the ripple component may be absorbed by the inertia of the rotor of the DC motor, the ripple component will not adversely affect the operation of the DC motor. However, when the output frequency of the generator is very low, the ripple component tends to cause vibrations of the rotor of the DC motor.

SUMMARY OF THE INVENTION

One of the objects of the present invention is therefore to provide a constant speed regulator for a DC motor capable of substantially eliminating the ripple component in the DC voltage which varies in response to the rotational speed of the DC motor.

Another object of the present invention is to provide a constant speed regulator capable of ensuring stabilized constant speed control of a DC motor having a rotor with low inertia, or a low-rotational speed DC motor.

A further object of the present invention is to provide a constant speed regulator for a DC motor which ensures stable constant speed control even when an abrupt change in power source voltage occurs.

Briefly stated, to accomplish the above and other objects, the present invention provides a constant speed regulator for a DC motor comprising a speed detecting circuit adapted to provide a DC output voltage which varies in response to the variation in rotational speed of a DC motor, a constant voltage circuit or voltage regulating circuit adapted to supply a constant voltage to said speed detecting circuit, a controlling transistor adapted to control the current flowing into said DC motor in response to the output of said speed detecting circuit, and a feedback circit interconnected between the junction between said DC motor and said controlling transistor and one point in said speed detecting circuit.

The present invention will become more apparent from the following description of one preferred embodiment thereof taken in conjunction with the accompanying drawing.

DESCRIPTION OF THE PREFERRED EMBODIMENT

Figure 1:
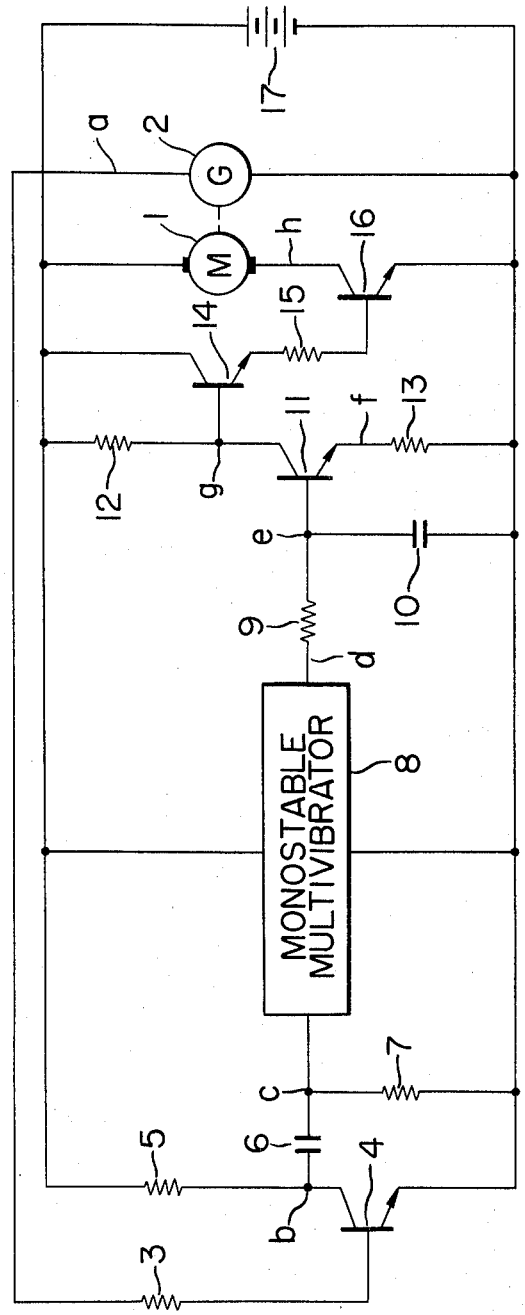
FIG. 1 is a circuit diagram of a prior art constant speed regulator.
Figure 2:
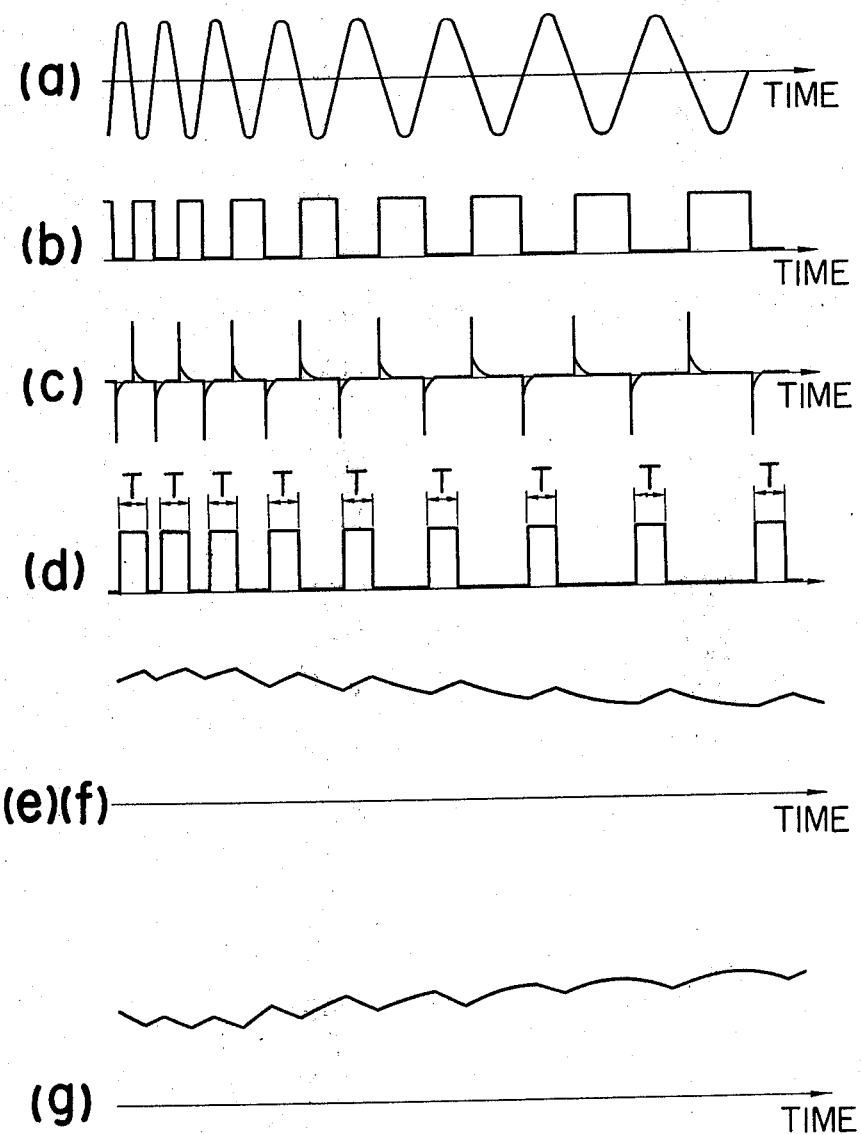
FIG. 2 is a view illustrating the waveforms of the outputs at various points in the circuit shown in FIG. 1.

Prior Art, FIGS. 1 and 2

Referring to FIG. 1 illustrating a prior art constant-speed regulator, a DC motor 1 is mechanically coupled to a generator 2 whose otput terminal is coupled through a resistor 3 to the base of a transistor 4. The emitter of the transistor 4 is coupled to a negative feed line while the collector is coupled through a resistor 5 to a positive feed line. A series-circuit consisting of a capacitor 6 and a resistor 7 is connected between the collector of the transistor 4 and the negative feed line, and the junction between the capacitor 6 and the resistor 7 is coupled to the input terminal of a monostable multivibrator 8. Another series-circuit consisting of a resistor 9 and a capacitor 10 is connected between the output terminal of the monostable multivibrator 8 and the negative feed line, and the junction between the resistor 9 and capacitor 11 is coupled to the base of a transistor 11. The emitter of the transistor 11 is coupled through a resistor 13 to the negative feed line while the collector is coupled through a resistor 12 to the positive feed line and is directly coupled to the base of a transistor 14. The collector of the transistor 14 is coupled to the positive feed line while the emitter is coupled through a resistor 15 to the base of a transistor 16. The emitter of the transistor 16 is coupled to the negative feed line, and the DC motor 1 is inserted between the collector of the transistor 16 and the positive feed line. The generator 2 generates the output signal whose frequency is proportional to the rotational speed of the DC motor 1.

Next referring to FIG. 2, the mode of operation will be described hereinafter. When the rotational speed of the DC motor 1 gradually decreases because of the variation in load, the generator 2 generates the output signal with the waveform shown in FIG. 2($a$) (the waveform of the output signal appearing at the point $a$ in FIG. 1). When the output signal goes positive, the transistor 4 is turned on, but when the output signal goes negative, the transistor 4 is turned off. The waveform of the signal appearing at the collector of the transistor 4 is shown in FIG. 2($b$) (the waveform of the output signal at the point $b$ in FIG. 1). The collector signal passes through a differentiating circuit comprising the capacitor 6 and the resistor 7 so that the output signal at the point $c$ in FIG. 1 has the waveform shown in FIG. 2($c$). In response to the negative-going spikes of the output signal of the differentiating circuit, the monostable multivibrator 8 is triggered so that the output signal (at the point $d$ in FIG. 1) has the waveform shown in FIG. 2(d). That is, the output signal of the monostable vibrator 8 has a square waveform whose duty cycle changes depending upon the frequency of the trigger pulses applied to the vibrator 8. The pulse duration or width of the output signal shown in FIG. 2(d) is dependent upon a parameter of the monostable multivibrator 8. The output signal of the monostable multivibrator 8 passes through an integrator comprising the resistor 9 and the capacitor 11 so that the output signal (at the point e in FIG. 1) has the waveform shown in FIG. 2(e). It is seen that when the rotational speed of the DC motor 1 gradually decreases, the DC voltage at the point e in FIG. 1 also gradually decreases. Consequently the collector current of the transistor 11 changes, and the emitter current of the transistor 11 (at the point f in FIG. 1) has a waveform similar to that shown in FIG. 2(e). The waveform of the collector current of the transistor 11 (at the point g in FIG. 1) is shown in FIG. 2(g). It is seen that the DC voltage at the point g in FIG. 1 rises as the rotational speed of the DC motor 1 decreases. Therefore, the collector current of the transistor 14 increases so that the base current of the transistor 16 also increases. Thus the transistor 16 so functions as to increase the rotational speed of the DC motor 1 to a predetermined rate.

When the rotational speed of the DC motor 1 increases, the voltage at the point e increases in FIG. 1 while the voltage at the point g in FIG. 1 drops. As a result, the transistor 16 so functions as to decrease the rotational speed of the DC motor 1.

Referring back to FIG. 1, resistor 3 and 15 are inserted in order to limit the base currents to the transistor 4 and 16, respectively.

As shown in FIG. 2(e), the DC component which varies depending upon the rotational speed of the DC motor 1 contains the ripple components whose frequency is dependent upon the frequency of the output of the generator 2. No problem arises when the frequency of the ripple component is so high that the ripple component is absorbed by the inertia of the rotor of the motor 1. However, when the rotor has a low inertia or when the output frequency of the generator 2 is considerably low, the ripple component causes the rotor of the motor 1 to vibrate.

To overcome this problem, a method has been proposed wherein a local feedback signal is inserted into a control circuit to cancel the ripple component. For instance, a series circuit consisting of a capacitor and a resistor is connected between the points g and h in FIG. 1 so that an AC negative feedback loop may be formed. Therefore, the ripple component at the point g may be decreased.

However, when the voltage of a DC source 17 changes abruptly, the voltage across the points g and h also changes abruptly so that the charging and discharging currents flow into and out of the capacitor resulting in unstable speed control.

The present invention was therefore made to overcome the above problem.

Figure 3:
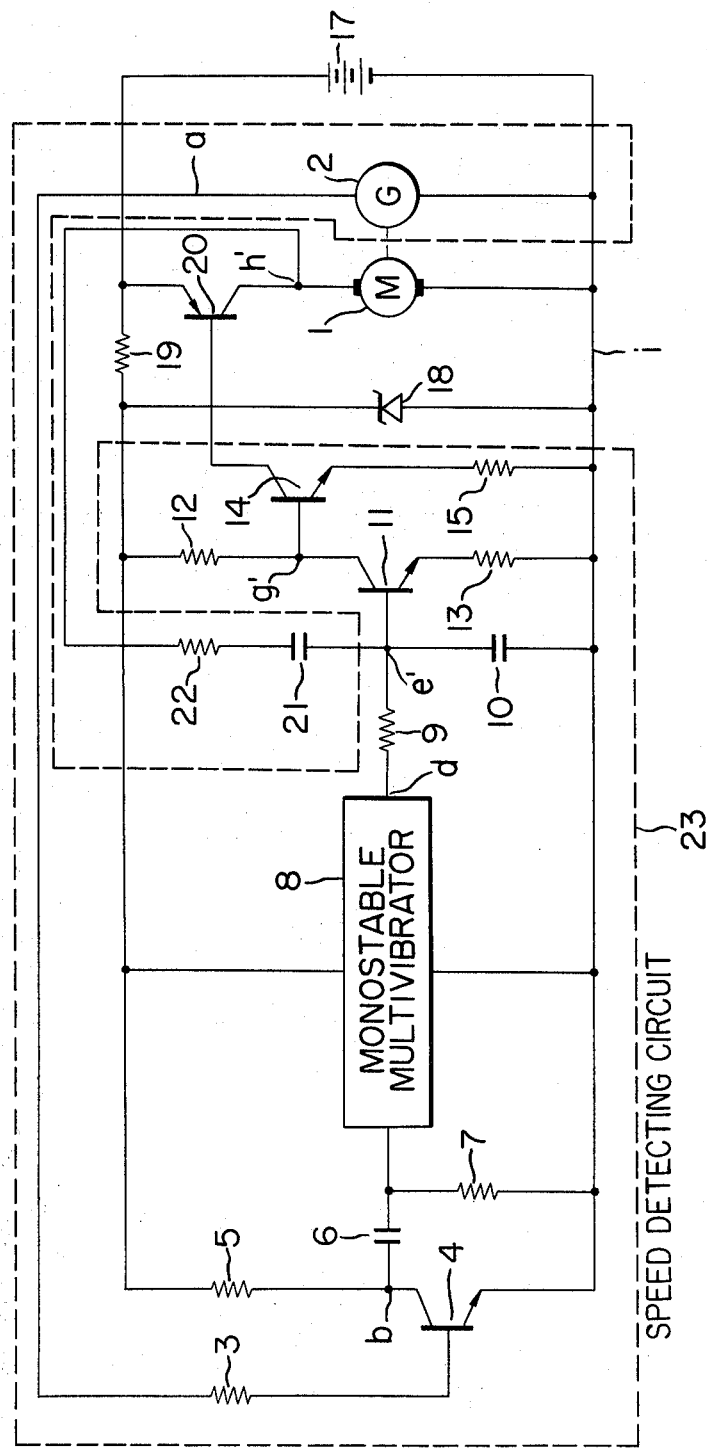
FIG. 3 is a circuit diagram of a constant speed regulator in accordance with the present invention.

The Invention, FIG. 3

In FIG. 3 illustrating the constant-speed regulator in accordance with the present invention, parts similar to those shown in FIG. 1 are designated by the same reference numerals, and their arrangements and modes of operation will not be described again in the following description of the present invention.

The emitter of the transistor 14 is coupled through the resistor 15 to the negative feed line. A constant voltage diode 18 is connected between the positive and negative feed lines, and a resistor 19 is connected between the positive feed line and the positive power source line. The collector of the transistor 14 is coupled to the base of a driving transistor 20. The emitter of the transistor 20 is coupled to the positive power source line while the collector is coupled to one terminal of the DC motor 1. The other terminal of the DC motor 1 is coupled to the negative power source line. A series-circuit consisting of a capacitor 21 and a resistor 22 is connected between the base of the transistor 11 and the collector of the transistor 20.

In FIG. 3, the generator 2, the resistor 3, the transistor 4, the resistor 5, the capacitor 6, the resistor 7, the monostable multivibrator 8, the resistor 9, the capacitor 10, the transistor 11, the resistors 12 and 13, the transistor 14 and the resistor 15 (all encircled by broken lines) constitute a speed detecting circuit generally indicated by 23. The DC output of the speed detecting circuit 23 changes in response to the variation in rotational speed of the DC motor 1. The negative feed line constitutes a common source line i.

Next the mode of operation will be described hereinafter. The transistor 20 accomplishes the same function as that of the transistor 16 shown in FIG. 1. That is, it controls the rotational speed of the DC motor 1 in response to the DC output of the speed detecting circuit 23.

As is readily seen from FIG. 2, the signal at the point e' in FIG. 3 is inverted in phase and appears at the point g'. In like manner, the signal at the point g' is also inverted in phase and appears at the collector of the transistor 14. The signal appearing at the point h' is in phase with the signal at the point g'. The series-circuit consisting of the capacitor 21 and the resistor 22 is connected between the points e' and h' and constitutes an AC negative feedback loop. Therefore, the ripple component at the point e' may be made zero when the values of the capacitor 21 and the resistor 22 are suitably selected. Thus, a stabilized constant-speed control may be ensured.

Even when the voltage of the DC power source 17 changes abruptly, the voltage at the point e' is maintained at a constant level as long as the rotational speed of the DC motor 1 does not change. The voltage at the point g' is also maintained at a constant level due to the use of the constant voltage diode 18, and will not change as long as the rotational speed of the DC motor 1 does not change. Therefore, there will be no voltage variation across the points e' and h' so that stable control is always ensured.

What is claimed is:

1. A constant speed regulator for a DC motor comprising
   a. a positive feed line and a negative feed line one of which is a common power source line connected to one terminal of said DC motor,
   b. a positive source line and a negative source line one of which is a common power source line,
   c. a means for stabilizing the voltage between said positive feed line and said negative feed line,
   d. a speed detecting circuit for generating DC voltage or DC current corresponding to the speed of DC motor, said feed lines being connected to said speed detecting circuit to supply operating current therefore, whereby, due to said stabilizing means, the output DC voltage or DC current from said speed detecting circuit is not influenced by the change in power voltage between said source lines,
e. a driving transistor having its emitter-collector path connected between the other power source line and the other terminal of said DC motor, and
f. an AC negative feed-back means connected between an output terminal of DC voltage corresponding to the speed of said DC motor and said other terminal of said DC motor, whereby, said AC negative feed-back means decreases the AC ripple component of the power voltage applied to said DC motor.

2. A constant speed regulator for DC motor as defined in claim 1 wherein
a. said speed detecting circuit comprises
  1. a generator coupled to generating a wave form corresponding to the speed of said DC motor,
  2. means generating a square wave of which duty cycle is varied by the output signal of said generator corresponding to the speed of said DC motor, said voltage stabilizing means maintaining the amplitude of said square wave constant,
  3. means for smoothing said square wave for generating a DC voltage corresponding to the speed of said DC motor, and
  4. transistor means for amplifying the DC voltage for activating said driving transistor, and
b. said AC negative feed-back means comprising a capacitor.

3. A constant speed regulator for a DC motor as defined in claim 2 wherein,
a. said generator is an AC generator generating a frequency signal proportional to the speed of said DC motor,
b. said square wave generating means comprises a trigger pulse generator generating trigger pulse corresponding to the frequency signal generated by said AC generator and a monostable circuit triggered by said trigger pulse generator, and
c. said smoothing means is an integrator comprising a capacitor and resistor.

4. A constant speed regulator for a DC motor as defined in claim 2 wherein said AC negative feed-back means further comprises a resistor connected in series with said capacitor.

5. In a DC motor control circuit including positive and negative power source lines, a driving transistor having its emitter-collector path connected between one of said power source lines and one terminal of said DC motor, the other terminal of said DC motor being connected to the other power source line, control means for providing a DC voltage or current responsive to the speed of said DC motor and for applying said DC voltage or current to the base of said driving transistor for controlling the speed of said DC motor whereby the speed of said DC motor is maintained constant, a pair of feed lines for supplying operating voltage to said control means, one of said feed lines being common with one of said power source lines, and means for stabilizing the voltage between said feed lines; the improvement wherein said one of said feed lines is common with said other power source line, said control means having a control terminal at which the DC voltage is independent of the voltage between said power source lines, and an AC negative feedback circuit connected between said control terminal and said one terminal of said DC motor.

6. The control circuit of claim 5 wherein said negative feed-back circuit comprises a series capacitor.

7. The control circuit of claim 5 wherein said negative feed-back circuit comprises a capacitor and resistor connected in series between said control point and said one terminal or said DC motor.

8. The control circuit of claim 5 wherein said stabilizing means comprises a resistor connected between said power source lines connected to the emitter-collector path of said driving transistor and the other of said feed lines, and a voltage regulator connected between said feed lines, the collector of said driving transistor being connected to said one terminal of said DC motor, and wherein said negative feed-back circuit comprises a capacitor connected in series between said control point and said one terminal of said DC motor.

9. The motor control circuit of claim 8 wherein said negative feed-back circuit further comprises a resistor connected in series with said capacitor.

10. The motor control circuit of claim 8 wherein said control means comprises means for producing a pulse train of pulses having a repetition rate responsive to the speed of said DC motor, a first amplifier transistor, integrating means applying said pulses to said base of said amplifier-transistor, separate resistor means connecting the emitter and collector of said amplifier transistor to different said feed lines, and means applying signals at the collector of said amplifier-transistor to the base of said driving transistor, the base of said amplifying transistor comprising said control point.

11. The motor control circuit of claim 10 wherein said means appliance signals at the collector of said amplifying transistor comprises a second amplifying transistor having a base connected to the collector of said first amplifying transistor, a collector connected to the base of said driving transistor, and means connecting the emitter of said second amplifying transistor to said other power source line.

* * * * *